Patented June 30, 1931

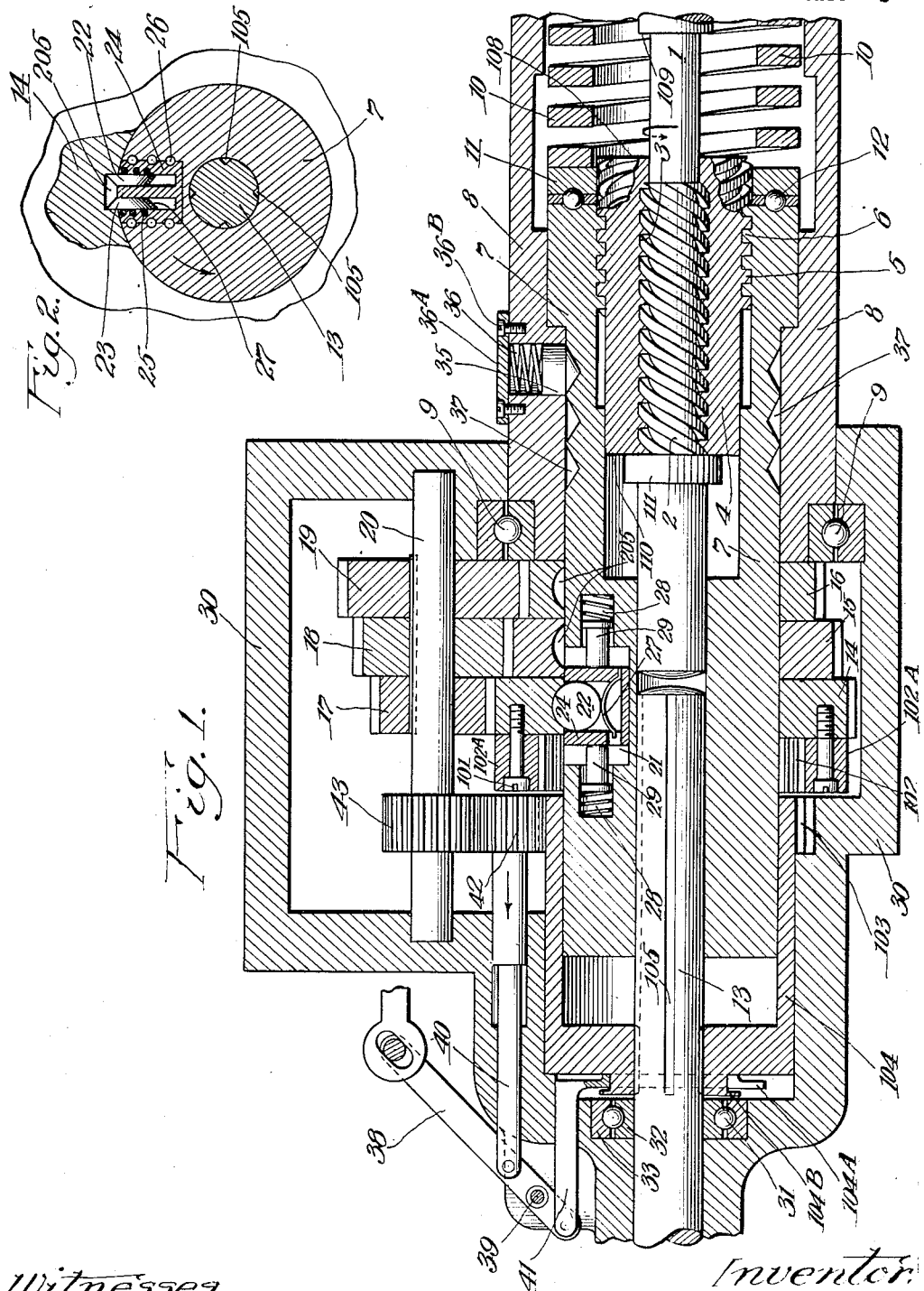

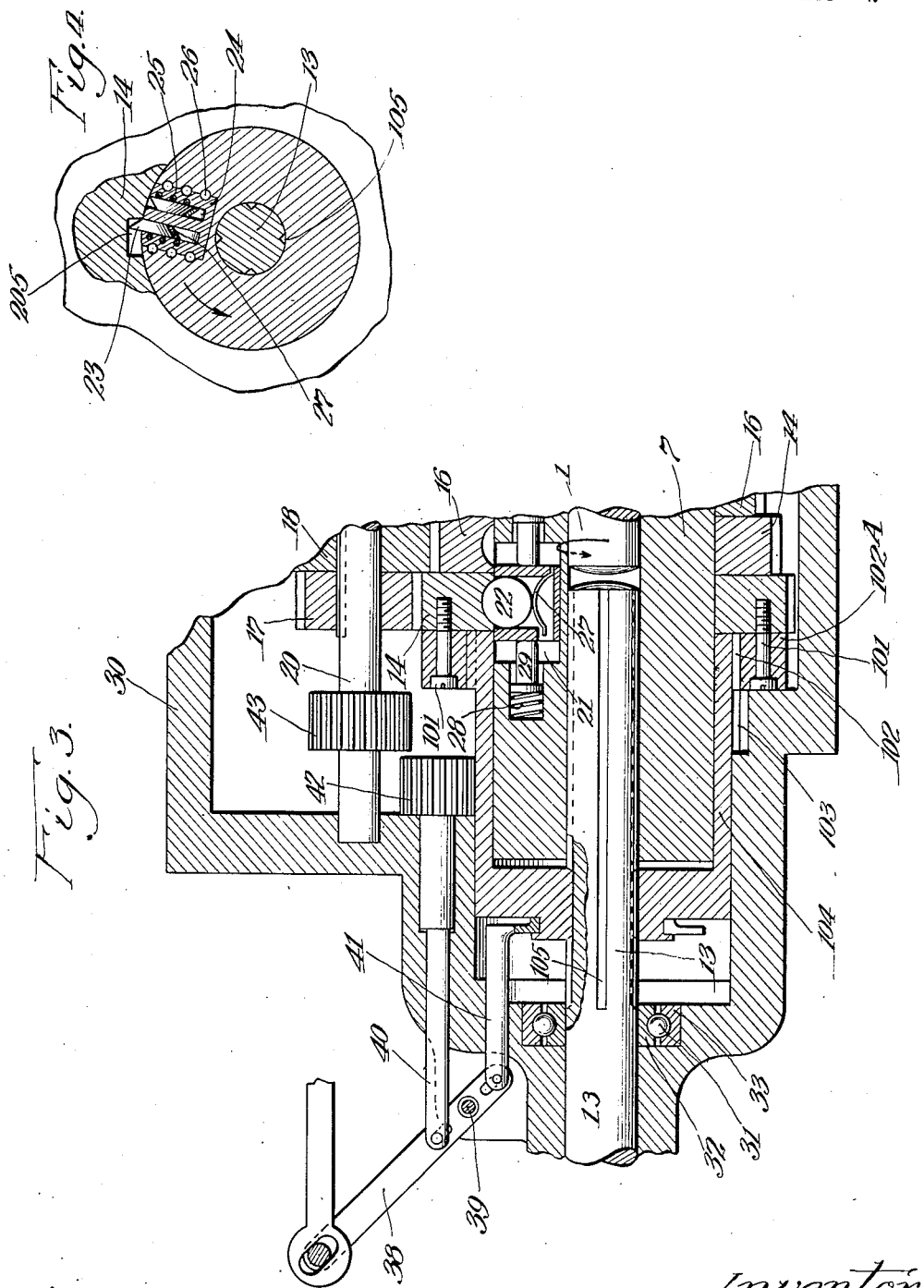

1,812,445

UNITED STATES PATENT OFFICE

FRED W. MAYER, OF CHICAGO, ILLINOIS

TORQUE CONTROLLED GEAR CHANGING MECHANISM

Application filed August 27, 1927. Serial No. 215,878.

This invention relates to automatically operated means for changing the gear ratio between a driving shaft and its driven shaft.

The main objects of this invention are to provide improved torque controlled means for automatically changing the gear ratio between the driving and driven shafts; to provide improved automatically operable means for maintaining the approximate correct gear ratio between the driving and driven shafts by the changes of torque on the driven shaft; to provide automatically operable means for maintaining a low gear ratio between the driving and driven shafts at times when the normally driven shaft tends to drive the driving shaft; and, to provide a generally improved torque controlled mechanism for use in conjunction with geared driving and driven shafts.

An illustrative embodiment of the invention is diagrammatically illustrated in the accompanying drawings wherein:

Fig. 1 is a longitudinal sectional view of the improved mechanism.

Fig. 2 is a fragmentary sectional view showing the improved clutch discs in engaged position.

Fig. 3 is a fragmentary longitudinal sectional view showing the reverse gearing in its inoperative position.

Fig. 4 is a fragmentary sectional view similar to Fig. 2 and showing the clutch discs in process of being engaged.

The invention described and claimed herein is an improvement over the invention described and claimed in my co-pending application for patent Serial No. 162,466, filed January 21, 1927, for gear ratio changing mechanism which matured into Patent Number 1,664,303. In the device therein shown and described no means were provided for automatically changing the gear ratio when the driven shaft was being rotated at a speed greater than the driving shaft. When therefore the motor car was traveling down hill, the drive would be through the highest gear ratio. In the present invention the gear ratio is not only automatically lowered when an abnormal load is being carried but it is also lowered when the rear wheels of the motor car are rotating the driven shaft at a speed greater than the rotation of the driving shaft.

In the construction shown in the drawings, a drive shaft 1 having a shoulder 109 rotates in the direction indicated by the arrow thereon and is provided with external worm gear teeth 2 which mesh with internal worm gear teeth 3 of a sleeve 4 so as to cause the sleeve to move axially thereon when restrained from rotating. Movement of the sleeve 4 to the right as viewed in Fig. 1 is limited by the end face 108 of the sleeve abutting against a collar 109 on shaft 1. Likewise, movement in the opposite direction is limited by the opposite end face 110 of the sleeve abutting against a collar 111 on shaft 1. These collars are spaced from each other a distance greater than the length of the sleeve 4 so as to allow a limited axial movement of the sleeve.

Within an outer sleeve 8 is a helical compression spring 10 which abuts the end of the sleeve, not shown, at one end and against a collar 11 at its other end. The collar 11 is provided with the ball races within which ball bearings 12 are carried which bear against the end of a gear changing sleeve 7. The sleeve 7 is provided with internal worm gear teeth 6 which mesh with external worm gear teeth 5 of the sleeve 4. The outer sleeve 8 encloses the sleeve 7 and is rotatable on the ball bearings 9, mounted on a main housing 30.

Mounted within the housing 30 is a nest of gears comprising gear wheels 14, 15 and 16 of different sizes, rotatable on the sleeve 7 and which mesh with a nest of complimentary gears comprising the gear wheels 17, 18 and 19 keyed on a counter shaft 20 journaled in the housing 30.

A driven shaft 13 journaled on bearings 31 in the housing 30 in axial alinement with the driving shaft 1 is provided with a series of axially disposed splines 105 equally spaced on its periphery and a cup shaped sleeve 104 is splined thereon and is axially shiftable by means of a yoke 104A engaging a collar 104B. The sleeve has a series of gear teeth 103 around its outer peripheral edge which are adapted to mesh when the sleeve is in one position with the internal gear teeth 102 of a ring 102A which is rigidly secured to the outer face of gear 14 by set screws 101, as shown in Fig. 3. When the sleeve 104 is shifted to its other position, as shown in Fig. 1, which is for reverse drive, the gear teeth 103 mesh with a pinion 42 journalled on an axially slidable shaft 40. The pinion 42 in turn meshes with a pinion 43 rigidly keyed on the countershaft 20. A link 38 is pivoted to the housing 30 by a stud 39 and the outer end of shaft 40 is pivotally connected to this link at a point in spaced relation to its pivot 39. An arm 41 is rigidly secured to the yoke 104A at one end and pivotally attached at its other end to the link 38 at a point in spaced relation to the pivot 39, on the opposite side thereof from the point of attachment of the shaft 40.

Means are provided for connecting the sleeve 7 to any one of the gears 14, 15, or 16 and comprise a pair of clutch discs 22 carried by a retainer 24 which is housed in a slot 21 cut in the outer periphery of the sleeve 7. A pair of opposed plungers 29 urged toward each other by compression springs 28 provide yielding means for reciprocating movement of the member 24, and spring tensioned fingers 27 tend to urge the clutch discs 22 radially outwardly so as to enter recesses 205 on the internal peripheries of the gear wheels 14, 15 and 16 when in registration therewith, as shown in Fig. 2.

As shown particularly in Fig. 4 of the drawings, the retainer member 24 is preferably provided with two clutch discs 22, the outer faces 23 thereof being beveled and facing toward each other so as to facilitate entering the recess 205 of the gears. Roller bearings 25 are provided on the inner side walls of retainer 24 for facilitating radial movement of the clutch discs into and out of their recesses. Ball bearings 26 are interposed between the side walls of the retainer member 24 and the side walls of the recesses 21 in which it is housed for aiding reciprocating movement of said retainer.

Means for aiding and assisting in holding the sleeve 7 in proper position until a difference in torque effects a gear change, are provided and comprise a tapered ended plunger 35 slidably mounted within a cylindrical recess 36 in the outer sleeve 8 which is adapted to enter any one of the annular grooves 37 in the sleeve 7. The plunger 35 is urged inwardly by a compression spring 36 which bears against the inner end of the plunger and against a plate 36A secured to the outer face of the sleeve 8 by screws 36B.

In operation, assume that there is a normal load on the driven shaft 13. The driving shaft 1 is rotated in the direction of the arrow thereon which causes the sleeve 4 to move toward the left until the end face 110 abuts against the shoulder 111. The leftward movement of the sleeve 4 is arrested by the collar 111, and further rotation of the shaft 1 causes the sleeve 7, which is restrained from rotation by the excessive torque applied thereon when it is connected by the discs 22 to one of the high-speed gears, to be moved to the right as viewed in Fig. 1 until the discs 22 are in registration with the recess 205 in the low speed gear 16. This rightward movement of the sleeve 7 compresses the spring 10, which, when completely compressed, limits the movement of the sleeve to a position in which the discs 22 are registered with the recess of the low speed gear 16. The sleeve 7, which is no longer free to move axially, rotates in unison with the shaft 1.

When the drive shaft 13 has overcome the excessive starting torque, the power stored in the spring 10 exceeds the force of the end thrust of the sleeve 7 and produces a leftward movement of the latter for bringing the discs 22 into registration with the intermediate speed gear 15. A similar operation takes place in bringing the discs 22 in registration with the high speed gear 14 after the torque on the sleeve has been further reduced.

Rotation of the sleeve 7 is transmitted to the sleeve 104, splined on the driving shaft 13, by the teeth 102 of the collar 102A which are meshed with teeth formed on the end portion of the sleeve 104. The collar 102A is rigidly mounted on the high-speed gear 14 and thus when the sleeve 7 is connected with the gear 14 by the discs 22, there is a direct driving relation between the shafts 1 and 13. When the sleeve 7 is connected with either the gear 15 or the gear 16 a driving connection through the pinion 17 serves to transmit rotation to the gear 14 and the collar 102A thereon.

Referring to Fig. 1, wherein the mechanism is shown in reverse gear, the drive from gear 14 is through gear 17 on the counter shaft 20, gear 43, reverse pinion 42, which in turn meshes with the gear teeth 103 on the sleeve 104, splined on the driven shaft 13.

Referring to Fig. 3, assume that the load is increased because of the effort of the car in going up a steep grade. The increased torque, through the threads 5 and 6, will draw the sleeve 7 against and compress the spring 10 causing the clutch discs 22 to slip out of engagement with the recess 205 in the gear 14. When the clutch discs are in registration with any of the recesses 205 in the gear 15, they will engage therein and the drive will be through the gear 15, the gear 18, carried on the shaft 20, then through gear 17, collar 102A, sleeve 104 to the driven shaft 13. Similarly, the clutch discs may be caused to engage within any of the recesses in the gear 16 if the load becomes still greater.

It will thus be seen that when ever the load is relatively light, the normal drive is through the gear wheel 14. If, however, the car is running down hill and the driven shaft is being rotated at a greater speed than the driving shaft is turning, the sleeve 4 will be rotated relative to the driving shaft 1 and the sleeve 4, together with the sleeve 7 will be caused to move toward the right until the face 108 thereof abuts against the shoulder 109. Further driving torque from the normally driven shaft will then compress the spring 10 and the clutch discs 22 will become disengaged from the gear 14 and the drive will be through either the gear 15 or 16, depending upon the driving torque of the normally driven shaft 13. In this manner effective braking is provided.

I claim:

1. In a device of the class described, driving and driven shafts, variable gear ratio changing mechanism between the driving and driven shafts, an intermediate sleeve threaded on one of said shafts, a gear changing sleeve oppositely threaded on said intermediate sleeve, yielding means bearing against said gear changing sleeve for positioning said sleeve in accordance with the torque on said shafts, and connections on said gear changing sleeve for engaging said gear mechanism.

2. In a device of the class described, driving and driven shafts, variable gear ratio changing mechanism between the driving and driven shafts, a driving sleeve having internal threads thereon concentric with said shafts, a sleeve having external and internal threads thereon threaded on the driving shaft, the internal threads being meshed with the threads of said driving sleeve for moving the latter in one direction to automatically determine the gear ratio between said shafts, and a spring for urging the driving sleeve in an opposite direction.

Signed at Chicago this 17th day of August, 1927.

FRED W. MAYER.